United States Patent [19]

Brown et al.

[11] Patent Number: 5,293,451
[45] Date of Patent: Mar. 8, 1994

[54] METHOD AND APPARATUS FOR GENERATING MODELS OF SPOKEN WORDS BASED ON A SMALL NUMBER OF UTTERANCES

[75] Inventors: Peter F. Brown, New York; Steven V. De Gennaro, Pawling; Peter V. Desouza, Mahopac Falls; Mark E. Epstein, Katonah, all of N.Y.

[73] Assignee: International Business Machines Corporation, Armonk, N.Y.

[21] Appl. No.: 602,020

[22] Filed: Oct. 23, 1990

[51] Int. Cl.$^5$ .................................................. G10L 9/04
[52] U.S. Cl. ..................................................... 395/2.54
[58] Field of Search .............................. 395/2.54, 2; 381/29-53

[56] References Cited

U.S. PATENT DOCUMENTS

| | | | |
|---|---|---|---|
| 4,297,528 | 8/1981 | Beno | 179/1 |
| 4,731,845 | 2/1988 | Matsuki et al. | 381/43 |
| 4,741,036 | 4/1988 | Bahl et al. | 381/43 |
| 4,759,068 | 7/1988 | Bahl et al. | 381/43 |
| 4,783,804 | 12/1988 | Juang et al. | 381/43 |
| 4,837,831 | 6/1989 | Gillick et al. | 381/43 |
| 4,903,305 | 2/1990 | Gillick et al. | 395/2 |

FOREIGN PATENT DOCUMENTS 0305215 4/1898 European Pat. Off. .

OTHER PUBLICATIONS

Bahl, L. R., et al. "Automatic Determination of Pronunciation of Words From Their Spellings." IBM Technical Disclosure Bulletin, vol. 32, No. 10B, Mar. 1990, pp. 19-23.

Lucassen, J. M., et al. "An Information Theoretic Approach to the Automatic Determination of Phonemic Baseforms." Proceedings of the 1984 IEEE International Conference on Acoustics, Speech, and Signal Processing, vol. 3, pp. 42.5.1-42.5.4, Mar. 1984.

Wilpon and Rabiner. "A Modified K-Means Clustering Algorithm for Use in Isolated Word Recognition." IEEE Transactions on Acoustics, Speech, and Signal Processing, vol. ASSP-33, No. 3, Jun. 1985, pp. 587-594.

"Composite Fenemic Phones," Research Disclosure, Emsworth, Hampshire, Great Britain, No. 256, Aug. 1985, p. 418.

Le K-F. "Allophone Clustering for Continuous Speech Recognition." *1990 International Conference on Acoustics, Speech, and Signal Processing*, Albuquerque, New Mexico, USA, Apr. 1990, pp. 749-752.

Primary Examiner—Michael R. Fleming
Assistant Examiner—Michelle Doerrler
Attorney, Agent, or Firm—Marc D. Schechter

[57] ABSTRACT

A method and apparatus for modeling words based on match scores representing (a) the closeness of a match between probabilistic word models and the acoustic features of at least two utterances, and (b) the closeness of a match between word models and the spelling of the word. A match score is calculated for a selection set of one or more probabilistic word models. A match score is also calculated for an expansion set comprising the probabilistic word models in the selection set and one probabilistic word model from a candidate set. If the expansion set match score improves the selection set match score by a selected nonzero threshold value, the word is modelled with the word models in the expansion set. If the expansion set match score does not improve the selection set match score by the selected nonzero threshold value, the word is modelled with the words in the selection set.

16 Claims, 5 Drawing Sheets

METHOD AND APPARATUS FOR GENERATING MODELS OF SPOKEN WORDS BASED ON A SMALL NUMBER OF UTTERANCES

BACKGROUND OF THE INVENTION

The invention relates to machine recognition of spoken words. More particularly, the invention relates to methods and apparatus for generating machine models of spoken words, and articles for configuring machines to perform such methods.

In a speech recognition machine, each word in the machine vocabulary is represented by a set of one or more models. When a user desires to add a new word to the vocabulary of the speech recognizer, at least one model corresponding to the new word must be generated.

A method of generating a speech recognition model of a word based on the spelling of the word and one utterance of the word is described in an article by J. M. Lucassen et al entitled "An Information Theoretic Approach to the Automatic Determination of Phonemic Baseforms" (*Proceedings of the 1984 IEEE International Conference on Acoustics, Speech, and Signal Processing*, Vol. 3, pages 42.5.1–42.5.4, March 1984).

An unrecognized problem in the Lucassen et al method occurs if the user utters the new word multiple times. Each utterance of the new word will likely generate a different model. Since it will likely be impractical to store all of the word models generated by all of the utterances of the new word, there is a need to select a subset of one or more word models for the new word.

SUMMARY OF THE INVENTION

It is an object of the invention to provide a method and apparatus for generating a set of one or more word models for representing a new word to be added to the vocabulary of a speech recognition machine.

It is another object of the invention to provide a method and apparatus for generating a set of word models representing a word on the basis of a weighted average of their acoustic match scores with at least two utterances, and their spelling-to-sound match scores with the spelling of the word.

According to the invention, in a method and apparatus for modeling words, a word is uttered at least two times. Each utterance has at least one acoustic feature having a value. The value of the acoustic feature of each utterance is measured. A selection set of one or more probabilistic word model signals is stored. Each probabilistic word model signal in the selection set represents a probabilistic model of the word.

For the selection set, a match score is calculated representing the closeness of a match between the probabilistic word models in the selection set and the value of the acoustic feature of each utterance.

A candidate set of one or more probabilistic word model signals is also stored. Each probabilistic word model signal in the candidate set represents a probabilistic model of the word. Each probabilistic word model signal in the candidate set is different from each probabilistic word model in the selection set.

An expansion set is also stored. The expansion set comprises the probabilistic word model signals in the selection set and one probabilistic word model signal from the candidate set. For the expansion set, a match score is calculated representing the closeness of a match between the probabilistic word models in the expansion set and the value of the acoustic feature of each utterance. If the expansion set match score improves the selection set match score by a selected nonzero threshold value, the word is modelled with the word models in the expansion set.

If the expansion set match score does not improve the selection set match score by the selected nonzero threshold value, the word is modelled with the word models in the selection set.

The invention also is an article for configuring a machine to perform such a method of modeling words.

Preferably, a spelling signal representing the spelling of the word is also stored. Each set (for example, a candidate set, a selection set, or an expansion set) match score then represents a weighted combination of (a) the closeness of a match between the probabilistic word models in the set of models and the values of the acoustic feature of the utterances, and (b) the closeness of a match between the probabilistic word models in the set of models and the spelling of the word.

In one aspect of the invention, each set match score is calculated by calculating, for each probabilistic word model in the set and for each utterance, a match score representing a weighted combination of (a) the closeness of a match between the probabilistic word model and the value of the acoustic feature of each utterance, and (b) the closeness of a match between the probabilistic word model and the spelling of the word. For each utterance, a best of-set match score is identified representing the best match score between the utterance and the probabilistic word models in the set. A set match score is calculated representing the average best-of-set match score for the probabilistic word models in the set on all utterances.

The invention may further comprise calculating, for each probabilistic word model in the candidate set, a joint match score representing a weighted combination of (a) the closeness of a match between a joint set of the candidate probabilistic word model and the probabilistic word models in the selection set and the value of the acoustic feature of each utterance, and (b) the closeness of a match between the joint set of probabilistic word models and the spelling of the word. The expansion set is selected as the joint set having the best joint match score.

Initially, the selection set consists of one probabilistic word model having a match score better than the match score of any one probabilistic word model in the candidate set.

In another aspect of the invention, the value of at least one feature of a first utterance of a word is measured over a series of successive time intervals of equal duration. The feature value is measured during each time interval to produce a first series of feature vector signals representing the feature values of the first utterance. Similarly, the value of at least one feature of a second utterance of the same word is measured to produce a second series of feature vector signals representing the feature values of the second utterance.

Two or more probabilistic word model signals are stored. Each probabilistic word model signal represents a probabilistic model of the word. For each probabilistic word model and for each utterance, a match score is calculated representing the closeness of a match between the probabilistic word model and the series of feature vector signals produced by the utterance. For each probabilistic word model, an average-model match score is calculated representing the average match score for the word model and all utterances.

From the match scores calculated above, a first probabilistic word model having the best average-model match score is selected. Then, a second probabilistic word model is selected.

For each utterance, a best-of-set match score is identified representing the best match score between the utterance and the first and second probabilistic word models. A set-average match score is calculated representing the average best-of-set match score for the first and second probabilistic word models and all utterances. If the set-average match score improves the best average-model match score by a selected nonzero threshold value, the word is modelled with both the first and second probabilistic word models.

If the set-average match score does not improve the best average-model match score by the selected nonzero threshold value, the word is modelled with the first probabilistic word model but not with the second probabilistic word model.

The method and apparatus for modeling words according to the present invention are advantageous because they select a subset of one or more models for representing a new word which has been uttered multiple times. The method and apparatus do not select and do not save utterance-based word models which do not significantly improve the match score of the set of selected models. Thus, two or more different models of a word are selected only if two or more utterances of the word are significantly different.

DESCRIPTION OF THE PREFERRED EMBODIMENTS

Figure 1:
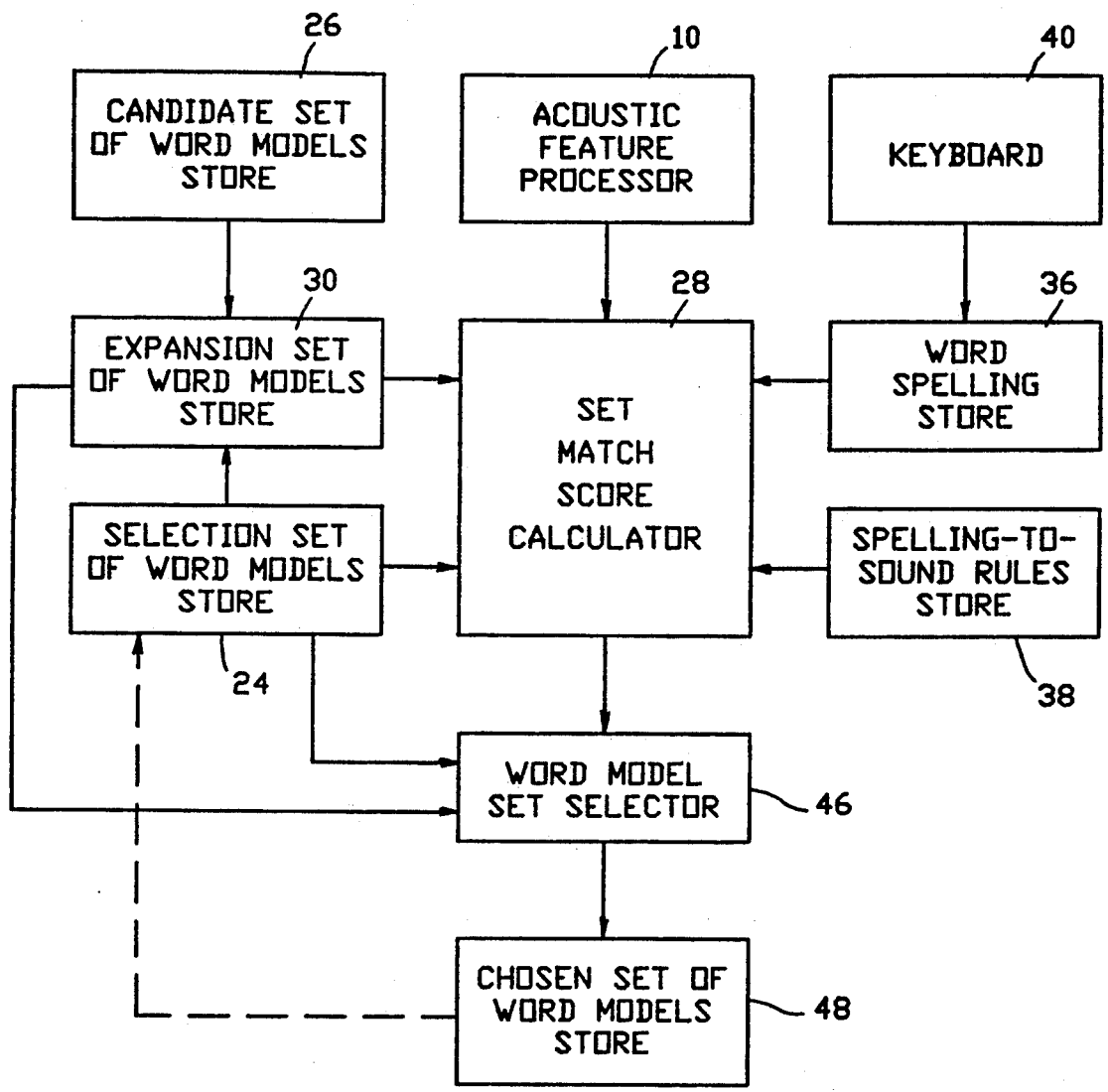
FIG. 1 is a block diagram of an apparatus for modeling words according to the present invention.

FIG. 1 shows an example of an apparatus for modeling words according to the present invention. In the method and apparatus according to the invention, a word is uttered at least two times. Each utterance has at least one acoustic feature having a value. The value of the acoustic feature of each utterance is measured by suitable means, for example, acoustic feature processor 10.

Figure 2:
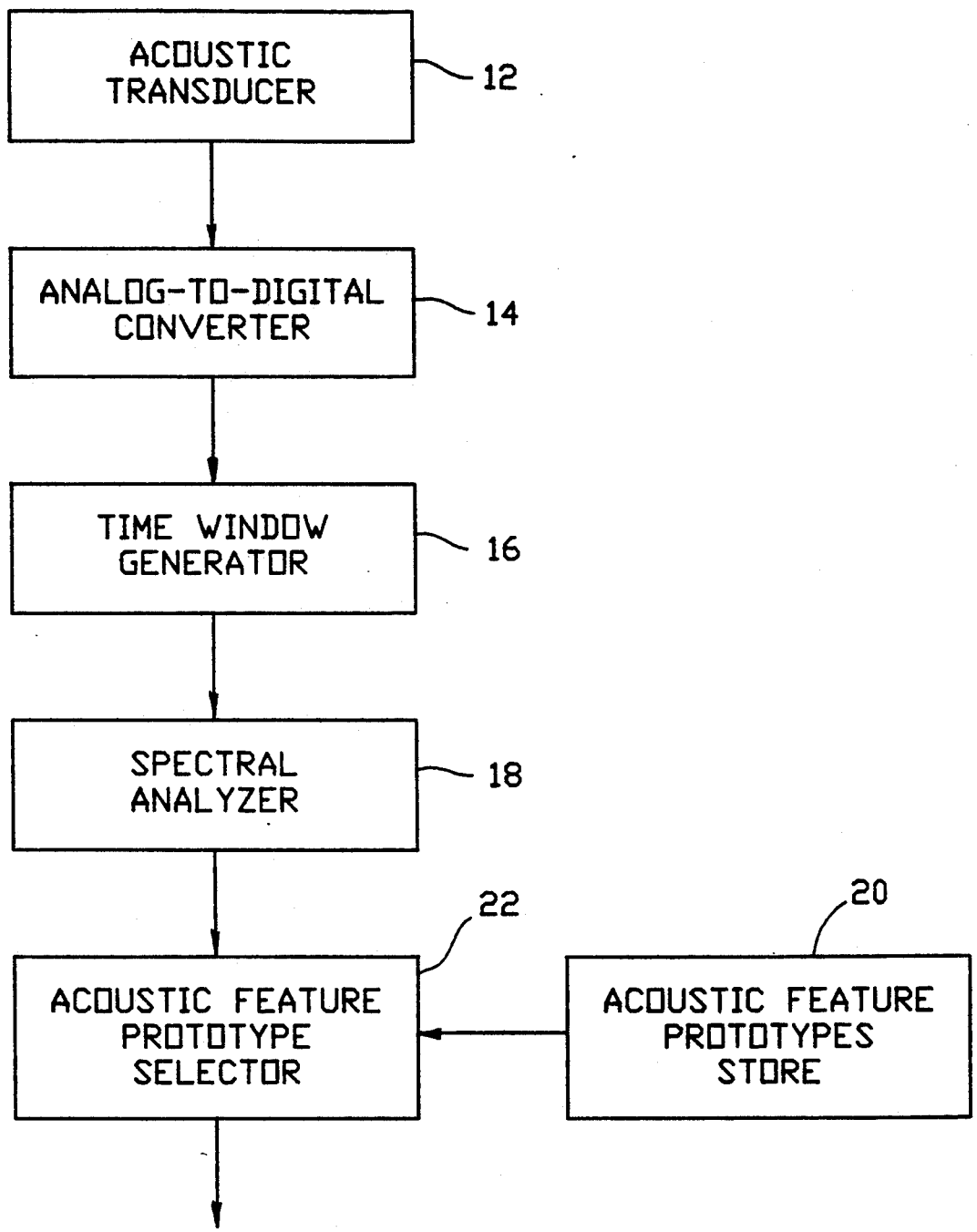
FIG. 2 is a block diagram of an apparatus for measuring the value of at least one acoustic feature of an utterance.

FIG. 2 is an example of an acoustic feature processor. An acoustic transducer 12, for example a microphone, converts an utterance of a word into an analog electrical signal. Analog-to-digital converter 14 transforms the analog electrical signal into a digital electrical signal such as a pulse code modulated signal.

A time window generator 16 samples the pulse code modulated electrical signal over a series of successive time intervals of equal duration A spectral analyzer 18 determines the amplitude of the pulse code modulated signal during each time interval in one or more frequency bands to produce an acoustic feature vector of one or more dimensions.

A number of acoustic feature prototype vectors are stored in acoustic feature prototypes store 20. Each acoustic feature prototype has the same number of dimensions as each acoustic feature vector. However, the value of each acoustic feature prototype vector is predetermined and fixed.

Acoustic feature prototype selector 22 compares each acoustic feature vector with all of the prototypes in store 20. The closest prototype is output from selector 22 as a label representing the value of the measured feature of the utterance during the corresponding time interval.

A speech recognition apparatus may store, for example, two hundred acoustic feature prototype vectors. For the purpose of illustrating a hypothetical example of the present invention, however, we will assume a set of five acoustic feature prototypes designated with the labels A through E, as shown in Table 1.

TABLE 1

| PROTOTYPE | LABEL |
|---|---|
| 1 | A |
| 2 | B |
| 3 | C |
| 4 | D |
| 5 | E |

To continue with this example, the word "LOG" is uttered twice We will hypothesize that on the first utterance of "LOG", the acoustic feature processor 10 outputs the label string ABBC. On the second utterance the acoustic feature processor 10 outputs the label string ADDC.

Returning to FIG. 1, the apparatus according to the invention includes a store 24 for a selection set of word models, and a store 26 for a candidate set of word models. Each set contains one or more probabilistic word model signals, each probabilistic word model signal representing a probabilistic model of the word. Each probabilistic word model in the candidate set is different from each probabilistic word model in the selection set.

Figure 3:
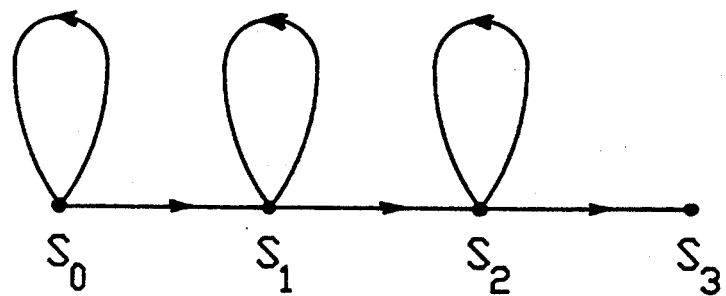
FIG. 3 schematically shows an example of a probabilistic word model.

FIG. 3 schematically shows an example of a probabilistic Markov model of a word. The Markov word model has four states $S_0$ through $S_3$. Each of states $S_0$ through $S_2$ has a transition from the state back to itself. Each of the states $S_0$ through $S_2$ has a transition from itself to the next state. Although not shown in FIG. 3, there is associated with each transition a probability of occurrence of the transition, and a probability of outputting a label representing an acoustic feature (for example corresponding to one of the labels A through E) on the occurrence of the transition.

A word model may be built up by concatenating one or more models of component sounds which are uttered when the word is spoken. A probabilistic Markov model of a component sound may consist, for example, of a single starting state, a single ending state, a transition from the starting state back to itself, and a transition from the starting state to the ending state. Each transition has, associated therewith, a probability of occurrence, and probabilities of occurrence of one or more labels representing acoustic features. More complex component sounds may be represented by probabilistic Markov models having a plurality of states and transitions.

In one method of generating word models, a word model may be made by concatenating a string of component sound models representing sounds corresponding to variations in the pronunciations of letters of the English alphabet. In the hypothetical example of Table 2, there are seventy component sound models M1 through M70 which may be concatenated in various combinations to form probabilistic word models.

TABLE 2

SPELLING TO SOUND MODEL PROBABILITIES
COMPONENT SOUND MODELS

| Letter | M1 | M2 | M3 | M4 | M5 | ... | M70 |
|---|---|---|---|---|---|---|---|
| A | 0.004 | 0.006 | 0.001 | 0.006 | 0.005 | ... | 0.003 |
| B | 0.007 | 0.001 | 0.002 | 0.008 | 0.003 | ... | 0.001 |
| C | 0.008 | 0.004 | 0.004 | 0.004 | 0.001 | ... | 0.005 |
| D | 0.004 | 0.008 | 0.009 | 0.003 | 0.003 | ... | 0.006 |
| E | 0.008 | 0.005 | 0.010 | 0.004 | 0.005 | ... | 0.006 |
| F | 0.003 | 0.005 | 0.006 | 0.010 | 0.008 | ... | 0.001 |
| G | 0.004 | 0.003 | 0.008 | 0.008 | 0.800 | ... | 0.150 |
| H | 0.001 | 0.009 | 0.005 | 0.006 | 0.003 | ... | 0.000 |
| I | 0.000 | 0.009 | 0.003 | 0.006 | 0.006 | ... | 0.008 |
| J | 0.002 | 0.006 | 0.003 | 0.005 | 0.005 | ... | 0.001 |
| K | 0.000 | 0.009 | 0.001 | 0.006 | 0.001 | ... | 0.005 |
| L | 0.008 | 0.004 | 0.005 | 0.900 | 0.008 | ... | 0.001 |
| M | 0.009 | 0.008 | 0.001 | 0.000 | 0.006 | ... | 0.002 |
| N | 0.002 | 0.008 | 0.005 | 0.003 | 0.008 | ... | 0.002 |
| O | 0.350 | 0.003 | 0.250 | 0.001 | 0.002 | ... | 0.000 |
| P | 0.004 | 0.003 | 0.007 | 0.006 | 0.001 | ... | 0.000 |
| Q | 0.008 | 0.004 | 0.005 | 0.002 | 0.005 | ... | 0.003 |
| R | 0.006 | 0.002 | 0.001 | 0.009 | 0.001 | ... | 0.004 |
| S | 0.002 | 0.006 | 0.008 | 0.009 | 0.001 | ... | 0.003 |
| T | 0.005 | 0.005 | 0.008 | 0.004 | 0.005 | ... | 0.005 |
| U | 0.008 | 0.001 | 0.006 | 0.005 | 0.002 | ... | 0.002 |
| V | 0.010 | 0.001 | 0.007 | 0.003 | 0.005 | ... | 0.010 |
| W | 0.004 | 0.002 | 0.007 | 0.004 | 0.006 | ... | 0.001 |
| X | 0.007 | 0.008 | 0.004 | 0.008 | 0.002 | ... | 0.007 |
| Y | 0.003 | 0.003 | 0.006 | 0.002 | 0.008 | ... | 0.008 |
| Z | 0.009 | 0.009 | 0.005 | 0.008 | 0.002 | ... | 0.009 |

Also as shown in Table 2, each letter of the alphabet, A through Z, is assigned a probability that the pronunciation of the letter in a word will produce a sound corresponding to each of the component sound models M1 through M70.

While the probabilities listed in Table 2 are hypothetical, useful probability data can be obtained by analysis of written and spoken language in the manner described in the article by Lucassen et al discussed above. Moreover, while the probabilities shown in the example of Table 2 are context-independent, context-dependent probability data would be expected to produce improved probabilistic word models.

In order to construct probabilistic word models based on the spelling of a word having m letters in the word, where there are n models of component sounds and where it is possible for each letter in the spelling of the word to correspond to a single component sound, it is possible to generate $n^m$ word models by concatenating different combinations of component sound models.

For example, the word "LOG" contains three letters. In the example of seventy component sound models, there are $70^3 = 343,000$ different possible word models for the word "LOG" which may be constructed from the component sound models.

While it is possible to examine all 343,000 possible word models for "LOG" to determine the best word models, various criteria can be used for selecting from the 343,000 possible word models only those models which are expected to be the best. In this example, for each letter in the word "LOG" the one or two component sound models having the highest probabilities were selected for constructing possible word models for "LOG". Based on the hypothetical probabilities shown in Table 2, the word models shown in Table 3 were constructed.

TABLE 3

Candidate Word Models for "LOG"

| L | O | G | Pronunciation |
|---|---|---|---|
| M4 | M1 | M5 | LÄG |
| M4 | M3 | M5 | LÖG |
| M4 | M1 | M70 | LÄJ |
| M4 | M3 | M70 | LÖJ |

The word models in Table 3 correspond to different possible pronunciations of "LOG". For example, component sound model M4 may correspond to the "L" sound in "BALL". Component sound model M1 may correspond to the "AW" sound in "LAW", while component sound model M3 corresponds to the "O" sound in "COT". Component sound model M5 may correspond to the "G" sound in "GOOD", and component sound model M70 may correspond to the "J" sound in "JOB". Table 3 includes the hypothetical pronunciation for each model.

The word models in Table 3 may be divided into a selection set and a candidate set in any suitable manner.

Returning to FIG. 1, a set match score calculator 28 calculates, for any set of models a match score representing the closeness of a match between the probabilistic word models in the set and the value of the acoustic feature of each utterance of the word.

Initially, the selection set may consist of one probabilistic word model having a match score better than the match score of any one probabilistic word model in the candidate set.

Thus, referring to the example of Table 3, initially the selection set consists of the one probabilistic word model from Table 3 having the best match score.

The individual match scores for the possible word models may be obtained by a weighted combination of (a) the closeness of a match between the probabilistic word model and the values of the acoustic feature of each utterance, and (b) the closeness of a match between the probabilistic word model and the spelling of the word.

Table 4 shows an example of the match score calculation for each of the word models of Table 3. In this example, the weighted average match score for an utterance is the sum of the acoustic match score multiplied by a weighting factor plus the spelling-to-sound score multiplied by a weighting factor.

TABLE 4

INDIVIDUAL MATCH SCORES

WORD: "LOG"

| Word Model | | | Spelling to Sound Score | Acoustic Match Score | | Weighted Average Match Score | | Match Score |
|---|---|---|---|---|---|---|---|---|
| | | | | A B B C | A D D C | A B B C | A D D C | |
| M4 | M1 | M5 | 0.252 | 0.006272 | 0.002688 | 0.004396 | 0.002604 | 0.003500 |
| M4 | M3 | M5 | 0.180 | 0.001434 | 0.008602 | 0.001617 | 0.005201 | 0.003409 |

TABLE 4-continued

INDIVIDUAL MATCH SCORES

WORD: "LOG"

| Word Model | | | Spelling to Sound Score | Acoustic Match Score | | Weighted Average Match Score | | Match Score |
|---|---|---|---|---|---|---|---|---|
| | | | | A B B C | A D D C | A B B C | A D D C | |
| M4 | M1 | M70 | 0.047 | 0.002509 | 0.001075 | 0.001491 | 0.000774 | |
| M4 | M1 | M70 | 0.034 | 0.000573 | 0.003441 | 0.000455 | 0.001889 | 0.001172 |

In this example, the weighting factor for the spelling to sound score is 0.005. The weighting factor for the acoustic match score is 0.5. In general, the weighting factor will be selected empirically. Preferably, the acoustic match score weighting factor increases relative to the spelling to sound score weighting factor as the number of utterances of the word increases. The total match score for a model is the mean of the weighted average match scores for the model over all utterances.

For each word model, the spelling-to-sound score may be obtained, for example, as the product of the probability of the component sound model given the corresponding letter in the spelling of the word, for all letters of the word. Thus, for baseform M4 M1 M5, the spelling-to-sound score is equal to $P(M4|"L")P(M1|"O")P(M5|"G")$. From the hypothetical probabilities of Table 2, the spelling-to-sound score is equal to $(0.9)(0.35((0.8)=0.252$.

The acoustic match score between each word model and each utterance may be obtained, for example, by calculating the probability that the word model would produce the acoustic labels representing the acoustic features of the utterance.

Figure 4:
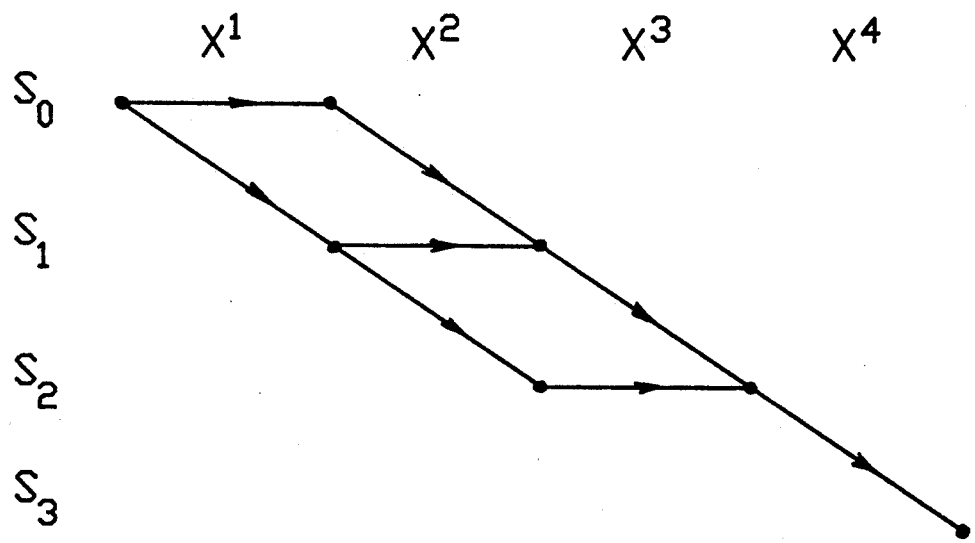
FIG. 4 is a diagram showing all possible paths of length four through the probabilistic word model of FIG. 3.

Tables 5–8 show the calculation of hypothetical acoustic match scores. For each word model, Tables 5–8 show hypothetical transition probabilities and label probabilities for the component sound models making up the proposed word models. These Tables also show the calculation of the acoustic match score as the probability that each hypothetical word model produces the observed the label string. The probabilities are calculated over all paths from state $S_0$ to state $S_3$ through each word model as shown in FIG. 4.

In Tables 5–8, the component sound model parameters are specified for each starting state Si and each final state Sf for a single transition. The transition probabilities are specified as $P(Sf|Si)$. The probability of label A being output for a selected transition is $P(A|Si \rightarrow Sf)$. Other label output probabilities are similarly specified.

The acoustic match scores are obtained by calculating, for each time period t, the probability $P(St,Xt|St-1)$ of observing output label Xt and ending in state St given prior state $(St-1)$. By summing over all paths ending at state St at time t, the probability $P(St,X1t)$ of being at state St and observing the labels X1 to Xt is obtained.

TABLE 5

| MODEL | Si | Sf | P(Sf\|Si) | P(A\|Si→Sf) | P(B\|Si→Sf) | P(C\|Si→Sf) | P(D\|Si→Sf) | P(E\|Si→Sf) |
|---|---|---|---|---|---|---|---|---|
| M4 | S0 | S0 | 0.1 | 0.7 | 0.1 | 0.1 | 0.1 | 0.0 |
| M4 | S0 | S1 | 0.8 | 0.7 | 0.1 | 0.1 | 0.1 | 0.0 |
| M1 | S1 | S1 | 0.1 | 0.1 | 0.5 | 0.1 | 0.3 | 0.0 |
| M1 | S1 | S2 | 0.8 | 0.1 | 0.5 | 0.1 | 0.3 | 0.0 |
| M5 | S2 | S2 | 0.1 | 0.1 | 0.1 | 0.5 | 0.1 | 0.2 |
| M5 | S2 | S3 | 0.8 | 0.1 | 0.1 | 0.5 | 0.1 | 0.2 |

| Xt | t | St-1 | St | P(St,Xt\|St-1) | P(St,X1t) |
|---|---|---|---|---|---|
| — | 0 | — | S0 | 1 | |
| A | 1 | S0 | S0 | 0.07 | 0.07 |
| A | 1 | S0 | S1 | 0.56 | 0.56 |
| B | 2 | S0 | S1 | 0.08 | 0.0336 |
| B | 2 | S1 | S1 | 0.05 | |
| B | 2 | S1 | S2 | 0.4 | 0.224 |
| B | 3 | S1 | S2 | 0.4 | 0.01344 |
| B | 3 | S2 | S2 | 0.01 | 0.00224 |
| C | 4 | S2 | S3 | 0.4 | 0.006272 |

| Xt | t | St-1 | St | P(St,Xt\|St-1) | P(St,X1t) |
|---|---|---|---|---|---|
| — | 0 | — | S0 | 1 | |
| A | 1 | S0 | S0 | 0.07 | 0.07 |
| A | 1 | S0 | S1 | 0.56 | 0.56 |
| D | 2 | S0 | S1 | 0.08 | 0.0224 |
| D | 2 | S1 | S1 | 0.03 | |
| D | 2 | S1 | S2 | 0.24 | 0.1344 |
| D | 3 | S1 | S2 | 0.24 | 0.005376 |
| D | 3 | S2 | S2 | 0.01 | 0.001344 |
| C | 4 | S2 | S3 | 0.4 | 0.002688 |

TABLE 6

| MODEL | Si | Sf | P(Sf\|Si) | P(A\|Si→Sf) | P(B\|Si→Sf) | P(C\|Si→Sf) | P(D\|Si→Sf) | P(E\|Si→Sf) |
|---|---|---|---|---|---|---|---|---|
| M4 | S0 | S0 | 0.1 | 0.7 | 0.1 | 0.1 | 0.1 | 0.0 |
| M4 | S0 | S1 | 0.8 | 0.7 | 0.1 | 0.1 | 0.1 | 0.0 |
| M1 | S1 | S1 | 0.1 | 0.1 | 0.5 | 0.1 | 0.3 | 0.0 |
| M1 | S1 | S2 | 0.8 | 0.1 | 0.5 | 0.1 | 0.3 | 0.0 |
| M5 | S2 | S2 | 0.1 | 0.1 | 0.1 | 0.5 | 0.1 | 0.2 |
| M5 | S2 | S3 | 0.8 | 0.1 | 0.1 | 0.5 | 0.1 | 0.2 |

TABLE 6-continued

| Xt | t | St-1 | St | P(St,Xt\|St-1) | P(St,X1t) |
|---|---|---|---|---|---|
| — | 0 | — | S0 | 1 | |
| A | 1 | S0 | S0 | 0.07 | 0.07 |
| A | 1 | S0 | S1 | 0.56 | 0.56 |
| B | 2 | S0 | S1 | 0.08 | 0.0168 |
| B | 2 | S1 | S1 | 0.02 | |
| B | 2 | S1 | S2 | 0.16 | 0.0896 |
| B | 3 | S1 | S2 | 0.16 | 0.002688 |
| B | 3 | S2 | S2 | 0.01 | 0.000896 |
| C | 4 | S2 | S3 | 0.4 | 0.00014336 |

| Xt | t | St-1 | St | P(St,Xt\|St-1) | P(St,X1t) |
|---|---|---|---|---|---|
| — | 0 | — | S0 | 1 | |
| A | 1 | S0 | S0 | 0.07 | 0.07 |
| A | 1 | S0 | S1 | 0.56 | 0.56 |
| D | 2 | S0 | S1 | 0.08 | 0.0392 |
| D | 2 | S1 | S1 | 0.06 | |
| D | 2 | S1 | S2 | 0.48 | 0.2688 |
| D | 3 | S1 | S2 | 0.48 | 0.018816 |
| D | 3 | S2 | S2 | 0.01 | 0.002688 |
| C | 4 | S2 | S3 | 0.4 | 0.0086016 |

TABLE 7

| MODEL | Si | Sf | P(Sf\|Si) | P(A\|Si→Sf) | P(B\|Si→Sf) | P(C\|Si→Sf) | P(D\|Si→Sf) | P(E\|Si→Sf) |
|---|---|---|---|---|---|---|---|---|
| M4 | S0 | S0 | 0.1 | 0.7 | 0.1 | 0.1 | 0.1 | 0.0 |
| M4 | S0 | S1 | 0.8 | 0.7 | 0.1 | 0.1 | 0.1 | 0.0 |
| M1 | S1 | S1 | 0.1 | 0.1 | 0.5 | 0.1 | 0.3 | 0.0 |
| M1 | S1 | S2 | 0.8 | 0.1 | 0.5 | 0.1 | 0.3 | 0.0 |
| M5 | S2 | S2 | 0.1 | 0.1 | 0.1 | 0.5 | 0.1 | 0.2 |
| M5 | S2 | S3 | 0.8 | 0.1 | 0.1 | 0.5 | 0.1 | 0.2 |

| Xt | t | St-1 | St | P(St,Xt\|St-1) | P(St,X1t) |
|---|---|---|---|---|---|
| — | 0 | — | S0 | 1 | |
| A | 1 | S0 | S0 | 0.07 | 0.07 |
| A | 1 | S0 | S1 | 0.56 | 0.56 |
| B | 2 | S0 | S1 | 0.08 | 0.0056 |
| B | 2 | S1 | S1 | 0.05 | 0.028 |
| B | 2 | S1 | S2 | 0.4 | 0.224 |
| B | 3 | S1 | S2 | 0.4 | 0.01344 |
| B | 3 | S2 | S2 | 0.01 | 0.00224 |
| C | 4 | S2 | S3 | 0.16 | 0.0025088 |

| Xt | t | St-1 | St | P(St,Xt\|St-1) | P(St,X1t) |
|---|---|---|---|---|---|
| — | 0 | — | S0 | 1 | |
| A | 1 | S0 | S0 | 0.07 | 0.07 |
| A | 1 | S0 | S1 | 0.56 | 0.56 |
| D | 2 | S0 | S1 | 0.08 | 0.0056 |
| D | 2 | S1 | S1 | 0.03 | 0.0168 |
| D | 2 | S1 | S2 | 0.24 | 0.1344 |
| D | 3 | S1 | S2 | 0.24 | 0.005376 |
| D | 3 | S2 | S2 | 0.01 | 0.001344 |
| C | 4 | S2 | S3 | 0.16 | 0.0010752 |

TABLE 8

| MODEL | Si | Sf | P(Sf\|Si) | P(A\|Si→Sf) | P(B\|Si→Sf) | P(C\|Si→Sf) | P(D\|Si→Sf) | P(E\|Si→Sf) |
|---|---|---|---|---|---|---|---|---|
| M4 | S0 | S0 | 0.1 | 0.7 | 0.1 | 0.1 | 0.1 | 0.0 |
| M4 | S0 | S1 | 0.8 | 0.7 | 0.1 | 0.1 | 0.1 | 0.0 |
| M1 | S1 | S1 | 0.1 | 0.1 | 0.5 | 0.1 | 0.3 | 0.0 |
| M1 | S1 | S2 | 0.8 | 0.1 | 0.5 | 0.1 | 0.3 | 0.0 |
| M5 | S2 | S2 | 0.1 | 0.1 | 0.1 | 0.5 | 0.1 | 0.2 |
| M5 | S2 | S3 | 0.8 | 0.1 | 0.1 | 0.5 | 0.1 | 0.2 |

| Xt | t | St-1 | St | P(St,Xt\|St-1) | P(St,X1t) |
|---|---|---|---|---|---|
| — | 0 | — | S0 | 1 | |
| A | 1 | S0 | S0 | 0.07 | 0.07 |
| A | 1 | S0 | S1 | 0.56 | 0.56 |
| B | 2 | S0 | S1 | 0.08 | 0.0168 |
| B | 2 | S1 | S1 | 0.02 | |
| B | 2 | S1 | S2 | 0.16 | 0.0896 |
| B | 3 | S1 | S2 | 0.16 | 0.002688 |
| B | 3 | S2 | S2 | 0.01 | 0.000896 |
| C | 4 | S2 | S3 | 0.16 | 0.00057344 |

| Xt | t | St-1 | St | P(St,Xt\|St-1) | P(St,X1t) |
|---|---|---|---|---|---|
| — | 0 | — | S0 | 1 | |
| A | 1 | S0 | S0 | 0.07 | 0.07 |
| A | 1 | S0 | S1 | 0.56 | 0.56 |
| D | 2 | S0 | S1 | 0.08 | 0.0392 |

TABLE 8-continued

| | | | | | |
|---|---|---|---|---|---|
| D | 2 | S1 | S1 | 0.06 | |
| D | 2 | S1 | S2 | 0.48 | 0.2688 |
| D | 3 | S1 | S2 | 0.48 | 0.018816 |
| D | 3 | S2 | S2 | 0.01 | 0.002688 |
| C | 4 | S2 | S3 | 0.16 | 0.00344064 |

The results of the acoustic match calculations are summarized in Table 4, above. Since the word model M4M1M5 has the best match score, it is chosen to form the initial selection set. Since word model M4M1M5 is the only word model in the initial selection set, the initial selection set match score is equal to the word model match score. (See Table 9.)

TABLE 9

WORD: "LOG"

| | | SELECTION SET MATCH SCORE | | | |
|---|---|---|---|---|---|
| | Spelling to | Acoustic Match Score | | Weighted Average Match Score | |
| Word Model | Sound Score | A B B C | A D D C | A B B C | A D D C |
| M4 M1 M5 | 0.252 | 0.006272 | 0.002688 | 0.004396 | 0.002604 |
| Selection Set Match Score | | | | | 0.0035 |

After identifying the one probabilistic word model M4M1M5 having the best match score for the initial selection set, the remaining word models are stored in candidate set store 26 of FIG. 1.

From the candidate set of word models, a single candidate model is combined with the selection set of word models to form an expansion set which is stored in the expansion set store 30. (FIG. 1.) For the expansion set, the set match score calculator 26 calculates a match score representing the closeness of the match between the probabilistic word models in the expansion set and the value of the acoustic feature of each utterance.

Figure 5:
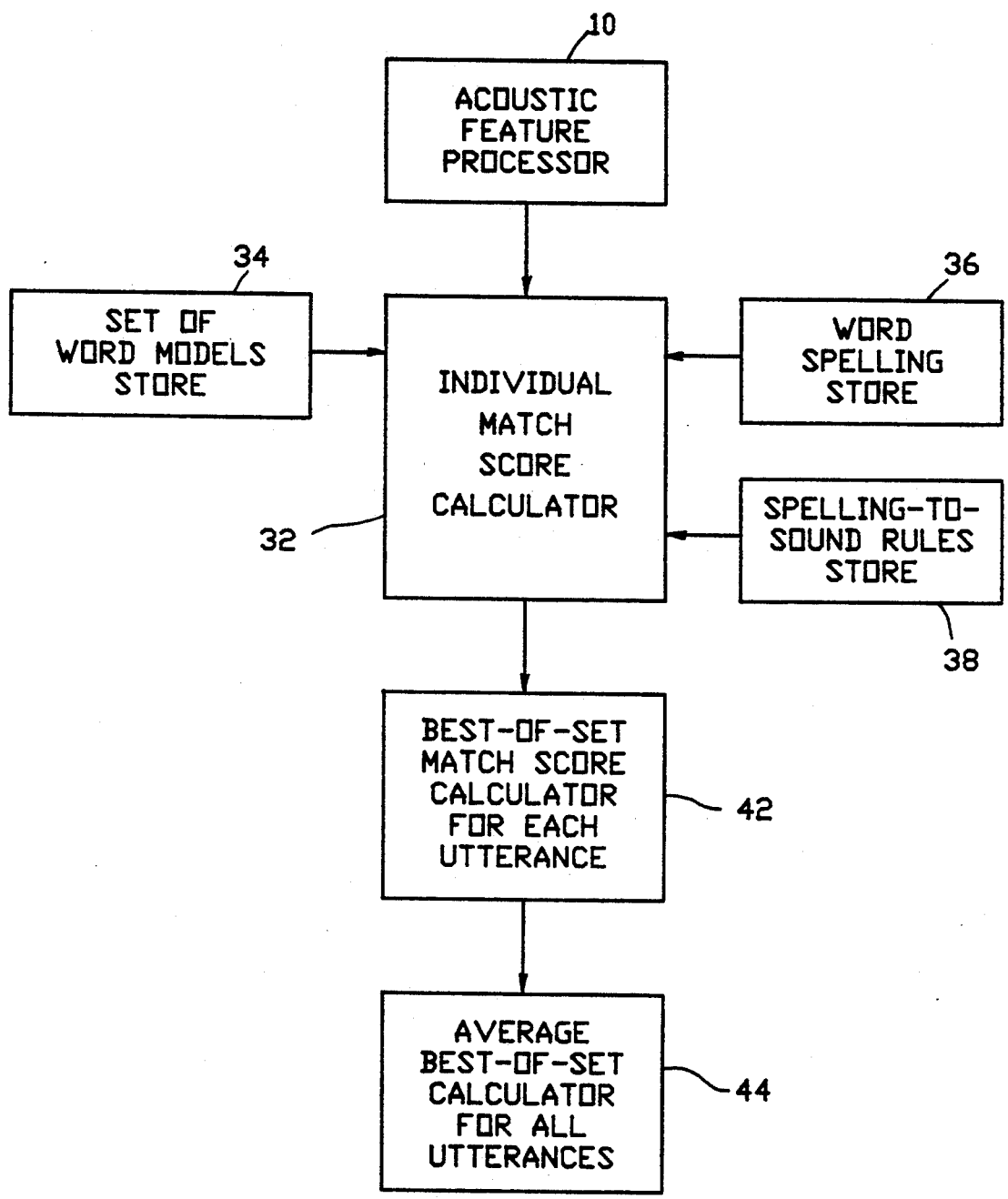
FIG. 5 is a block diagram of an apparatus for calculating a set match score.

FIG. 5 is a block diagram of an example of the structure of a set match score calculator 28. The set match score calculator 28 comprises an individual match score calculator 32 which receives input from acoustic feature processor 10 and a set of word models store 34 The store 34 of FIG. 5 corresponds to one or more of the stores 24, 26, or 30 of FIG. 1. Set match score calculator 32 also receives input from word spelling store 36 and spelling-to-sound rules store 38 The word spelling may be entered into word spelling store 36 by way of a keyboard 40.

Individual match score calculator 32 calculates, for each probabilistic word model in the set and for each utterance, a match score representing a weighted combination of (a) the closeness of a match between a probabilistic word model and the value of the acoustic feature of each utterance, and (b) the closeness of a match between the probabilistic word model and the spelling of the word.

The individual match scores from calculator 32 are passed to a best-of-set match score calculator 42. The best-of-set match score calculator 42 identifies, for each utterance, a best-of-set match score representing the best match score between the utterance and the probabilistic word models in the set.

The best-of-set match scores from calculator 36 are passed to an average best-of-set calculator 44. The average best-of-set calculator 44 calculates a set match score representing the average best-of-set match score for the probabilistic word models and all utterances.

Returning to FIG. 1, the apparatus according to the present invention includes word model set selector 46 which receives the set match scores from calculator 28.

If the expansion set match score improves the selection set match score by a selected nonzero threshold value, word model set selector 46 models the word with the word models in the expansion set. The word models in the expansion set are then output to the chosen set of word models store 48. Alternatively, if the expansion set match score does not improve the selection set match score by the selected nonzero threshold value, then word model set selector 46 models the word with the word models in the selection set. In this case, the word models in the selection set are stored in the chosen set of word models store 48.

The word models stored in chosen set of word models store 38 may, if desired, form a new selection set of word models, as shown by the broken line in FIG. 1. In this case, the method according to the present invention can be repeated with the new selection set, in order to decide whether further improvement (above the threshold) can be obtained by adding another model from the candidate set.

Figure 6:
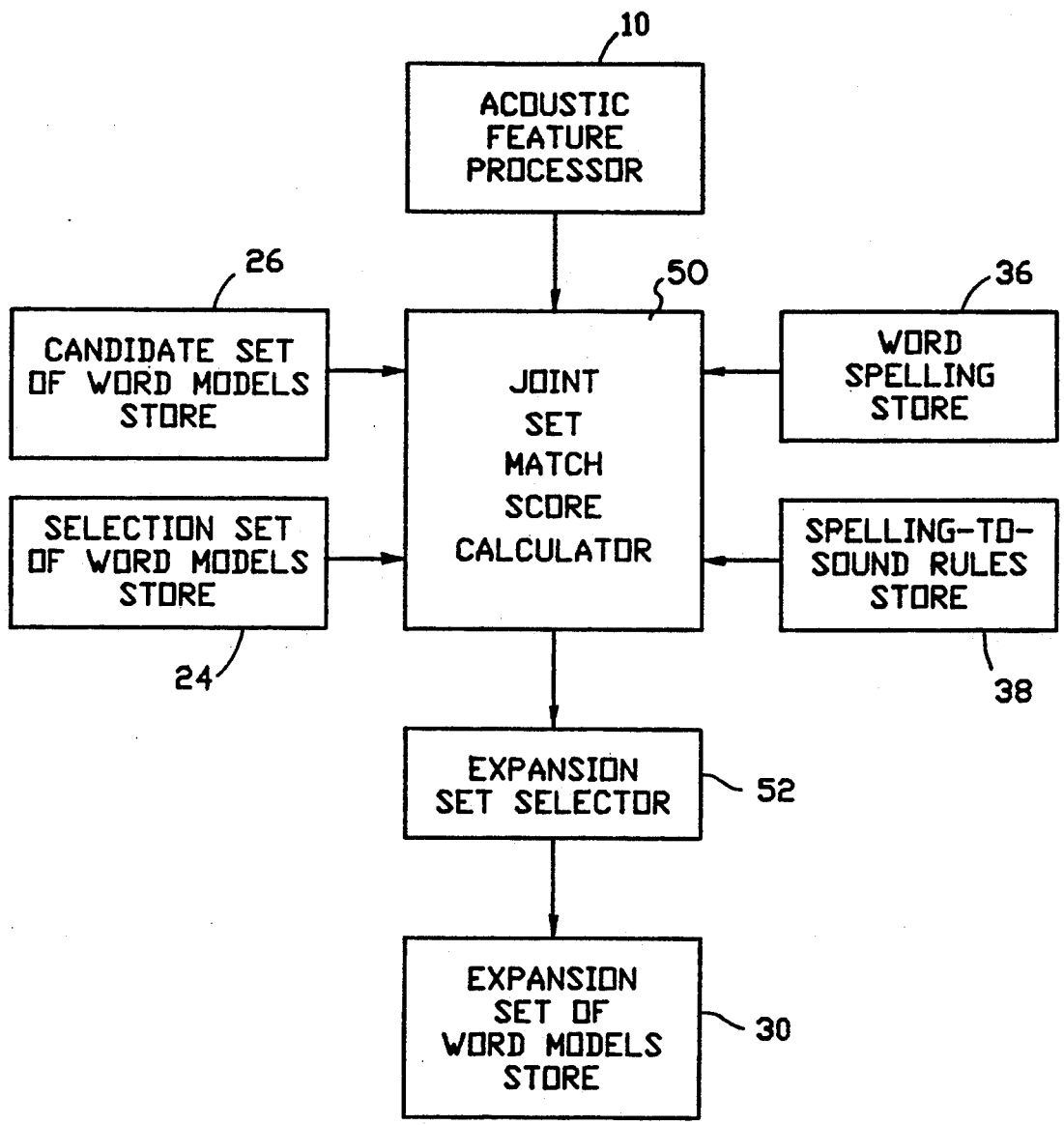
FIG. 6 is a block diagram of an apparatus for selecting an expansion set.

FIG. 6 is a block diagram of an example of an apparatus for choosing the word models to be incorporated into the expansion set for the purpose of the present invention. The apparatus includes a joint match score calculator 50 which receives input from acoustic feature processor 10, selection set of word models store 24, candidate set of word models store 26, word spelling store 36, and spelling-to-sound rules store 38. The spelling-to-sound rules store 38 may contain, for example, a spelling-to-sound probability table such as of the form shown in Table 2, above. The joint match score calculator 50 calculates, for each probabilistic word model in the candidate set, a joint match score representing a weighted combination of (a) the closeness of a match between a joint set of the candidate probabilistic word model and the probabilistic word models in the selection set and the value of the acoustic feature of each utterance, and (b) the closeness of a match between the joint set of probabilistic word models and the spelling of the word.

The joint match scores from calculator 50 are input to an expansion set selector 52. The expansion set selector 52 chooses as the expansion set the joint set having the best joint match score. The chosen expansion set from selector 52 is passed to expansion set of word models store 30.

Preferably, the method and apparatus for modeling words according to the present invention are implemented by suitably programming a general purpose digital computer system having a suitable acoustic feature processor, such as described in connection with FIG. 2. The program configures the computer system to perform the method according to the invention.

Returning to the hypothetical example, Tables 10–12 show the joint set match score calculations. Since the joint set M4M1M5 and M4M3M5 has the best joint match score, it is chosen as the expansion set.

TABLE 10
JOINT SET MATCH SCORE
WORD: "LOG"

| Word Model | Spelling to Sound Score | Acoustic Match Score ABBC | ADDC | Weighted Average Match Score ABBC | ADDC |
|---|---|---|---|---|---|
| M4 M1 M5 | 0.252 | 0.006272 | 0.002688 | 0.004396 | 0.002604 |
| M4 M3 M5 | 0.180 | 0.001434 | 0.008602 | 0.001617 | 0.005201 |
| Best of Set Match Score | | | | 0.004396 | 0.005201 |
| Joint Set Match Score | | | | | 0.0047984 |

TABLE 11
JOINT SET MATCH SCORE
WORD: "LOG"

| Word Model | Spelling to Sound Score | Acoustic Match Score ABBC | ADDC | Weighted Average Match Score ABBC | ADDC |
|---|---|---|---|---|---|
| M4 M1 M5 | 0.252 | 0.006272 | 0.002688 | 0.004396 | 0.002604 |
| M4 M1 M70 | 0.047 | 0.002509 | 0.001075 | 0.001491 | 0.000774 |
| Best of Set Match Score | | | | 0.004396 | 0.002604 |
| Joint Set Match Score | | | | | 0.0035 |

TABLE 12
JOINT SET MATCH SCORE
WORD: "LOG"

| Word Model | Spelling to Sound Score | Acoustic Match Score ABBC | ADDC | Weighted Average Match Score ABBC | ADDC |
|---|---|---|---|---|---|
| M4 M1 M5 | 0.252 | 0.006272 | 0.002688 | 0.004396 | 0.002604 |
| M4 M3 M70 | 0.034 | 0.000573 | 0.003441 | 0.000455 | 0.001889 |
| Best of Set Match Score | | | | 0.004396 | 0.002604 |
| Joint Set Match Score | | | | | 0.0035 |

The calculated expansion set match score and the calculated selection match score are shown in Table 13. If the improvement in the match score exceeds the selected nonzero threshold value, then the word will be modelled with the word models in the expansion set. In that case, the word "LOG" will be modelled with the pronunciations "LOG" and "LAG", but will not be modelled with the pronunciations "LOJ" or "LAJ".

TABLE 13
WORD MODEL SET SELECTION
WORD: "LOG"

| | |
|---|---|
| Expansion Set Match Score | 0.0047984 |
| Selection Set Match Score | 0.003500 |
| Improvement in Match Score | 0.0012984 |

We claim:

1. A method of modeling a word uttered at least two times, each utterance having at least one acoustic feature having a value, said method comprising the steps of:

measuring the value of the acoustic feature of each utterance;

storing a selection set of one or more probabilistic word model signals, each probabilistic word model signal in the selection set representing a probabilistic model of the word;

calculating, for the selection set, a match score representing the closeness of a match between the probabilistic word models in the selection set and the value of the acoustic feature of each utterance;

storing a candidate set of one or more probabilistic word model signals, each probabilistic word model signal in the candidate set representing a probabilistic model of the word, each probabilistic word model in the candidate set being different from each probabilistic word model in the selection set;

storing an expansion set comprising the probabilistic word model signals in the selection set and one probabilistic word model signal from the candidate set;

calculating, for the expansion set, a match score representing the closeness of a match between the probabilistic word models in the expansion set and the value of the acoustic feature of each utterance; and modeling the word with the word models in the expansion set if the expansion set match score surpasses the selection set match score by a nonzero threshold value.

2. A method as claimed in claim 1, further comprising the step of modeling the word with the word models in the selection set if the expansion set match score does not surpass the selection set match by the nonzero threshold value.

3. A method as claimed in claim 1, characterized in that the word has a spelling, the method further comprises the step of storing a spelling signal representing the spelling of the word, and each set match score represents a weighted combination of:

the closeness of a match between the probabilistic word models in the set of models and the values of the acoustic feature of the utterances; and the closeness of a match between the probabilistic word models in the set of models and the spelling of the word.

4. A method as claimed in claim 3, characterized in that each set match score is calculated by the steps of:

calculating, for each probabilistic word model in the set and for each utterance, a match score representing a weighted combination of (a) the closeness of a match between the probabilistic word model and the value of the acoustic feature of each utterance, and (b) the closeness of a match between the probabilistic word model and the spelling of the word;

identifying, for each utterance, a best-of-set match score representing the best match score between the utterance and the probabilistic word models in the set;

calculating a set match score representing the average best-of-set match score for the probabilistic word models and all the utterances.

5. A method as claimed in claim 4, further comprising the steps of:

calculating, for each probabilistic word model in the candidate set, a joint match score representing a weighted combination of (a) the closeness of a match between a joint set of the candidate probabilistic word model and the probabilistic word models in the selection set and the value of the acoustic feature of each utterance, and (b) the closeness of a match between the joint set of probabilistic word models and the spelling of the word; and choosing as the expansion set the joint set having the best joint match score.

6. A method as claimed in claim 1, characterized in that the selection set consists of one probabilistic word model having a set match score better than the match score of any one probabilistic word model in the candidate set.

7. A method of modeling words, said method comprising the steps of:

measuring the value of at least one feature of a first utterance of a word during each of a series of successive time intervals to produce a first series of feature vector signals representing the feature values of the first utterance;

measuring the value of at least one feature of a second utterance of the same word during each of a series of successive time intervals to produce a second series of feature vector signals representing the feature values of the second utterance;

storing two or more probabilistic word model signals, each probabilistic word model signal representing a probabilistic model of the word;

calculating, for each probabilistic word model and for each utterance, a match score representing the closeness of a match between the probabilistic word model and the series of feature vector signals produced by the utterance;

calculating, for each probabilistic word model, an average-model match score representing the average match score for the word model and all utterances;

selecting a first probabilistic word model having the best average-model match score;

selecting a second probabilistic word model;

identifying, for each utterance, a best-of-set match score representing the best match score between the utterance and the first and second probabilistic word models;

calculating a set-average match score representing the average best-of-set match score for the first and second probabilistic word models and all utterances; and modeling the word with both the first and second probabilistic word models if the set-average match score surpasses the best average-model match score by a nonzero threshold value.

8. A method as claimed in claim 7, further comprising the step of modeling the word with the first probabilistic word model but not with the second probabilistic word model if the set-average match score does not surpass the best average-model match score by the nonzero threshold value.

9. A method as claimed in claim 8, characterized in that the word has a spelling, and each match score represents a weighted combination of:

the closeness of a match between a probabilistic word model and the value of the acoustic feature of the utterances; and the closeness of a match between the probabilistic word model and the spelling of the word.

10. An apparatus for modeling words, said apparatus comprising:

means for measuring the value of at least one acoustic feature of each of at least two utterances of a word;

means for storing a selection set of one or more probabilistic word model signals, each probabilistic word model signal in the selection set representing a probabilistic model of the word;

means for calculating, for the selection set, a match score representing the closeness of a match between the probabilistic word models in the selection set and the value of the acoustic feature of each utterance;

means for storing a candidate set of one or more probabilistic word model signals, each probabilistic word model signal in the candidate set representing a probabilistic model of the word, each probabilistic word model in the candidate set being different from each probabilistic word model in the selection set;

means for storing an expansion set comprising the probabilistic word model signals in the selection set and one probabilistic word model signal from the candidate set;

means for calculating, for the expansion set, a match score representing the closeness of a match between the probabilistic word models in the expansion set and the value of the acoustic feature of each utterance; and means for modeling the word with the word models in the expansion set if the expansion set match score surpasses the selection set match score by a nonzero threshold value.

11. An apparatus as claimed in claim 10, further comprising means for modeling the word with the word models in the selection set if the expansion set match score does not surpass the selection set match score by the nonzero threshold value.

12. An apparatus as claimed in claim 11, characterized in that the word has a spelling, the apparatus further comprises means for storing a spelling signal representing the spelling of the word, and each set match score represents a weighted combination of:
- the closeness of a match between the probabilistic word models in the set of models and the values of the acoustic feature of the utterances; and
- the closeness of a match between the probabilistic word models in the set of models and the spelling of the word.

13. An apparatus as claimed in claim 12, characterized in that the means for calculating each set match score comprises:
- means for calculating, for each probabilistic word model in the set and for each utterance, a match score representing a weighted combination of (a) the closeness of a match between the probabilistic word model and the value of the acoustic feature of each utterance, and (b) the closeness of a match between the probabilistic word model and the spelling of the word;
- means for identifying, for each utterance, a best-of-set match score representing the best match score between the utterance and the probabilistic word models in the set;
- means for calculating a set match score representing the average best-of-set match score for the probabilistic word models and all the utterances.

14. An apparatus as claimed in claim 13, further comprising:
- means for calculating, for each probabilistic word model in the candidate set, a joint match score representing a weighted combination of (a) the closeness of a match between a joint set of the candidate probabilistic word model and the probabilistic word models in the selection set and the value of the acoustic feature of each utterance, and (b) the closeness of a match between the joint set of probabilistic word models and the spelling of the word; and
- means for selecting as the expansion set the joint set having the best joint match score.

15. An apparatus as claimed in claim 10, characterized in that the selection set consists of one probabilistic word model having a match score better than the match score of any one probabilistic word model in the candidate set.

16. An apparatus as claimed in claim 10, characterized in that the measuring means comprises a microphone for converting the utterances of the word into analog electrical signals.

* * * * *